UNITED STATES PATENT OFFICE.

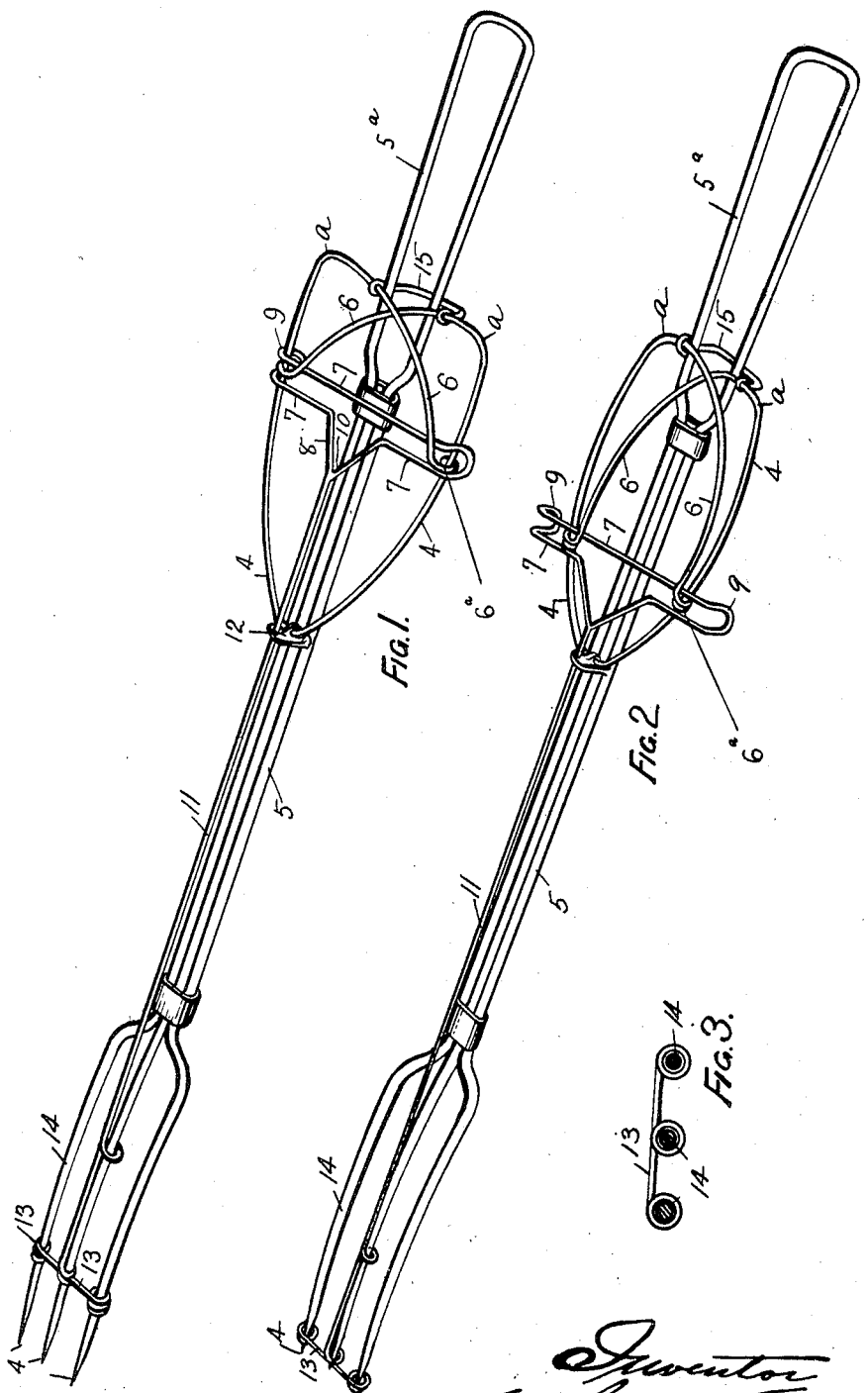

ARTHUR HENRY EDWARDS, OF SYDNEY, NEW SOUTH WALES, AUSTRALIA.

FORK ATTACHMENT FOR REMOVING FOOD OR OTHER MATERIAL IMPALED THEREON.

1,036,472.  Specification of Letters Patent.  Patented Aug. 20, 1912.

Application filed May 27, 1911. Serial No. 629,924.

*To all whom it may concern:*

Be it known that I, ARTHUR HENRY EDWARDS, a subject of the King of Great Britain and Ireland, residing at 4 Chapman street, Moore Park, Sydney, in the State of New South Wales, Commonwealth of Australia, have invented new and useful Improvements in Fork Attachments for Removing Food or other Material Impaled Thereon, of which the following is a specification.

This invention relates to a simple and efficient device which can be combined with a fork for the purpose of removing any material impaled upon its tines, and the object of the invention is to so arrange this device that it can be readily and positively operated by the pressure of the hand holding the fork. In carrying out this object, I provide the fork with two compressible levers, fixed at one end to the fork shank, interjacent the handle and the tines, to actuate a movable element as they compress and expand, and I provide the tines of the fork with a terminal element having a sliding connection, through the movable element, with the compressible levers, so that the compression of the levers by the pressure of the hand holding the fork, will move the terminal element forward and eject the material impaled on the tines, and the release of the pressure therefrom, will effect the restoration of the parts to their initial position.

For an understanding of the invention, reference is to be had to the following description and to the accompanying drawings, in which:

Figure 1, is a perspective view of a fork with the device in its normal position. Fig. 2, is a similar view to Fig. 1, with the device in its operated position, and Fig. 3, is a cross sectional view showing the terminal element and the tines.

Like characters of reference refer to like parts throughout the specification and drawings.

In the construction of the device, I use two compressible levers $a$, which as shown in Figs. 1 and 2, are substantially V-shaped. Each of these levers $a$ consists of an element 4 brazed or otherwise securely attached to the fork shank 5, interjacent the handle $5^a$ and the tines 14, and an element 6 having a loop $6^a$ which encircles the element 4 of the other lever and forms a sliding connection therewith. The levers $a$ are preferably made of curved spring wire and, in their normal position as shown in Fig. 1, are bowed outward to the limits permitted by the elements 6 and the keeper 15 which is looped around the elements 6. The levers $a$ are compressed toward the shank and handle of the fork by the pressure of the hand which is holding the same, the compressed position of the levers being that shown in Fig. 2, and when the pressure of the hand is removed from the levers, they automatically resume the position shown in Fig. 1. Slidable on the elements 4 of the compressible levers, are two terminals 9 connected with the triangular frame 8 by basal members 7, the terminals 9, basal members 7 and triangular frame, constituting a movable member. To the apex 10 of the triangular frame 8 is secured one end of a connecting rod 11, the other end of which is secured to a terminal element 13 slidable on the tines 14 of the fork, the connecting rod 11 being guided by an apertured plate 12, fixed to the shank 5 adjacent to the place where the ends of the elements 4 are secured.

In the use of the device, it is customary to hold the fork and its attachment in one hand. When the material is being impaled upon the tines, the levers are in the position shown in Fig. 1. To eject the material from the tines, the levers $a$ are compressed by pressure applied from the hand holding the fork, the terminal element 13 then moving into the position shown in Fig. 2 and pushing the material from the points 4 of the tines, the movement of the terminal element being effected by the sliding connection of the element 6 of each lever on the element 4 of the other lever, causing their loops $6^a$ to engage with the terminals 9 of the frame 8 and force the terminals 9 and frame 8 in the direction of the tines and effect a corresponding movement of the connecting rod 11 and the terminal element 13. When the compression of the levers is relieved, they automatically spring back into the position shown in Fig. 1, the loops $6^a$ again engaging the terminals 9 and drawing the frame 8, connecting rod 11 and terminal element 13 with them.

By means of a construction of this character, it is possible to hold the fork and operate the attachment by the same hand.

Having thus fully described the nature of my invention, what I claim as new and desire to secure by Letters Patent, is:

1. A fork attachment comprising a terminal element, two compressible spring levers, each consisting of an element fixed at one end and having its other end relatively free and slidably connected with the other lever, a movable element on the levers, actuated by the sliding connection of the free ends of the levers on each other, and means connecting the movable element with the terminal element.

2. A fork attachment comprising two compressible spring levers, each consisting of a lever element fixed at one end and having its other end movable and slidably connected with the other lever element, a movable element slidably mounted on the lever elements and actuated by the movable ends of the lever elements, and a terminal element connected with the movable element.

3. In the hereinbefore described device, in combination, a fork comprising a handle part and tines, and a fork attachment comprising two compressible spring levers, each consisting of a lever element fixed at one end to the handle part and having its other end relatively movable and looped to form a sliding connection with the other lever, a movable element comprising two terminal members engaged by the looped ends of the lever elements and a terminal element slidable on the tines of the fork and connected with the terminal members.

4. In the hereinbefore described device, a fork comprising a set of tines, in combination with a fork attachment comprising a terminal element slidable on the tines, a movable element connected with the terminal element, and two compressible levers, each fixedly connected at one end to the fork and having its other end relatively free and slidably connected to the other lever to engage with the movable element.

In testimony whereof I have signed my name to this specification in the presence of two subscribing witnesses.

ARTHUR HENRY EDWARDS.

Witnesses:
   WALKER SIGMOND,
   HILDA LAUDER.